April 28, 1931.    G. MEURISSE    1,803,121
POLO BALL
Filed March 26, 1930
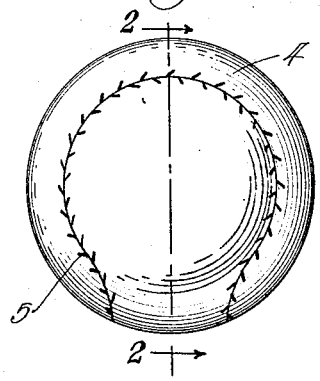
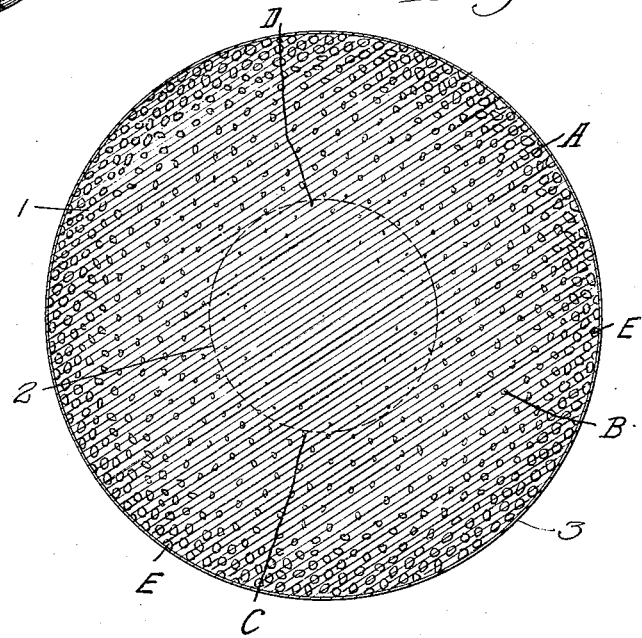
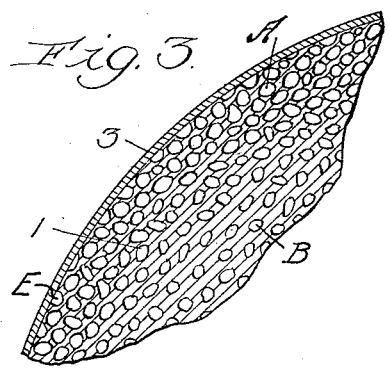
Inventor:
Gordon Meurisse
by Albert Scheibli
   Attorney Patented Apr. 28, 1931

1,803,121

UNITED STATES PATENT OFFICE

GORDON MEURISSE, OF CHICAGO, ILLINOIS, ASSIGNOR TO CHARLES MEURISSE & COMPANY, OF CHICAGO, ILLINOIS, A COPARTNERSHIP CONSISTING OF CHARLES C. MEURISSE, GORDON MEURISSE, ARTHUR MEURISSE AND ROY C. MEURISSE

POLO BALL

Application filed March 26, 1930. Serial No. 438,968.

My invention relates to resilient and shock-resisting balls of the general class of polo balls and indoor base balls, and aims to provide a ball of this class which will afford the following long sought combination of desirable qualities, namely:

Lightness, resilience to a high but limited degree, substantial balancing, accurate directioning of the ball when struck, continuous normally maintained shape, and durability.

In some of its general objects my invention aims to provide a ball of this class in which the needed resiliency is afforded partly by the resiliency of the solid material of the core and partly by gas within cells in this material; and in which the momentum for the ball is afforded by diminishing the size of these cells and their gas content in the central core portion in proportion to the radially outer portions.

Furthermore, my invention aims to provide a ball employing a resilient and cellular core having its cells filled with gas, and a tough cover of leather or the like, in combination with means interposed between the core and the cover for insuring a ready adjustment of adjacent portions thereof when both are distorted in shape, and for securing a speedy return of both the core and the cover to their normal shapes when the distorting strain ceases.

More particularly, my invention aims to provide a ball of this class in which both the lightness and the resiliency are secured by employing as the main portion or core of the ball a sphere of rubber having minute air cells having its cells imperforate and filled with a gas; and in which the gas filled cells decrease in size radially inward of the core, so that the outer portions of the core are readily compressible and relatively light while the central portion of the core is so much more dense as to insure an accurate directioning of the ball by a mallet.

Furthermore, my invention aims to provide a ball in which such a core is integrally housed by an elastic but non-cellular skin or film to prevent a damaging of the outer cellular portions of the core and to present a smooth spherical surface to the cover of the ball; and in which a tough but flexible cover of leather or the like is fitted snugly over the film-covered cellular rubber core.

Still further and also more detailed objects will appear from the following specification and from the accompanying drawings, in which Fig. 1 is an elevation of a polo ball embodying my invention.

Fig. 2 is an enlarged central and vertical section through the ball, taken along the line 2—2 of Fig. 1.

Fig. 3 is an enlargement of a portion of Fig. 2.

Polo balls differ in many respects from outdoor base balls, as for example in requiring much greater lightness, so that they will respond to the stroke of a mallet without cracking or otherwise damaging the slender and long cane shank needed by a rider for reaching the ball. However, an air-filled hollow ball would have far too much resiliency, a core of ordinary sponge rubber would be too much distorted in shape by the blow to secure an accurate directioning of the ball, and the heretofore proposed winding of a sponge rubber core with rubber threads would add unduly both to the weight of the ball and to its resiliency. So also, the threads of such windings are apt to be shifted out of their original positions when the cover of the ball is indented by an edge of the mallet head, thereby distorting the ball in shape and also unbalancing it.

Some of these differences apply also as to the ideal requirements for an indoor base ball in distinction from the characteristics needed in an outdoor base ball, for even the greater lightness would be desirable in an indoor base ball to lessen the fatiguing effect on the user. Hence the ball of my invention may be employed for different sports, although particularly adapted for use as a polo ball.

To overcome the above recited objections to an outdoor base ball construction when the ball is to be used in playing polo or indoor base ball, I employ as the core of my ball an integral sphere of socalled rubber froth, namely a sphere composed of rubber having minute cells, which sphere has substantially all of its cells sealed and filled with a gas, and has all of its cell walls of soft and resilient rubber. Such a core can be accurately produced in mould having a generally spherical interior, by subjecting a previously kneaded mixture of raw rubber with a suitable vulcanizing ingredient during the application of the vulcanizing temperature to an inert gas at such a high pressure that the gas permeates the mixture to form the desired cells, each of which cells is sealed from the others by the action of the vulcanizing ingredient, so that each such sealed cell thereafter retains its filling of gas.

When this procedure is employed with the gas introduced under high pressure from uniformly distributed points around the circumference of the vulcanizable mass, the gas is forced radially inward from substantially all directions toward the center of the core, and the pressure directed radially inward of the mass from all sides compacts the rubber in the central portion of the mass and reduces the size of the cells progressively radially inward of the mass. Consequently, the resulting vulcanized rubber sphere presents cells which progressively decrease in diameter radially inward of the core. By suitably controlling both the pressure and the time, the resulting ball of "rubber froth" can readily be formed with cells ranging in diameter (for example) from $\frac{1}{32}$ inch near the periphery of the ball to merely microscopic cells in the central portion of the ball; thereby producing an integral gas filled sphere in which the resiliency increases radially inward of the ball, since this resiliency depends mainly on the gas content of the cells.

At the same time, since the specific gravity of the rubber is enormously greater than that of any gas, the density of the ball increases radially inward of the ball, thus effectively providing a weight- and direction-enhancing central core portion as an integral part of the core. By suitably proportioning the amount of rubber to the inner radius of the mold in which the rubber is thus vulcanized while under the influence of an inert gas (such as air or nitrogen), this central core portion can readily be formed to provide the needed momentum for the ball when the latter is struck.

When the resulting rubber froth ball 1 is cut centrally, as in Fig. 2, the outward gas cells A will be larger than more inward gas cells B, and the cells C still nearer the center will average correspondingly smaller. Indeed, when the manufacture procedure is suitably adjusted as to both the pressure and the timing, most of the gas cells D in the central portion 2 of the ball will be so small that it will require a magnifying glass, or even a microscope, to see them. Moreover, such minute cells, most of which may be invisible to the unaided eye, will also be formed in the walls of the cells, so that the entire rubber of the ball is highly cellular and correspondingly light in weight.

With proper proportioning of the raw rubber or the like to the vulcanizing ingredient, and with a suitable timing (all of which is now understood by manufacturers of rubber goods) a sphere with such a distribution of relatively sealed and gas-filled cells can be produced while leaving the rubber (including both the outer surface portions and all of the walls between the cells) highly elastic and readily distortable.

The cell formation due to the use of gas under high pressure also will produce outwardly open cells or cup formations E at the periphery of the cellular rubber core. If the covering for the core engaged such a core directly, the edges of these cup formations would catch on portions of the cover when the cover is indented momentarily by the impact of a base ball club, and far more so when struck by an edge of the head of a polo mallet. Any such catching of the core on the cover would prevent the core from speedily resuming its normal and balanced shape. To prevent this, my above described core is first housed by a hollow spherical film 3 of elastic, non-cellular and imperforate rubber which preferably is formed upon and integrally secured to the core and which desirably presents a continuous and smooth spherical outer surface.

As a mechanical protection for this film, I then surround the film-covered core with a cover 4 of horsehide or the like, which preferably has a smooth inner surface. This cover preferably consists of two counterpart and substantially dumb-bell shaped pieces of leather, each previously stretched and pressed so that its interior presents the desired portion of a spherical surface, and these two cover parts are secured to each other by a lacing 5. Owing to the lightness of the rubber core when provided with such minute air cells, I am thus able to produce a polo ball having all of the qualities desired by expert polo players and of unusually light weight—as for example, a total weight of 5 ounces for a polo ball 4½ inches in diameter.

When my above described ball is in use, the film 3 on the core cooperates with the cover 4 in distributing pressure or other strains on the cover, the relatively large amount of gas in the radially outer portions of the core afford the needed resiliency, and the more dense and heavy central portion 2 of the core affords an accurate flight-directing of the ball. By integrally securing the film 3 to the core and by making this film elastic, I prevent any strains (such as those due to an indenting of the cover by an edge of the mallet) from being localized, so that my ball is also unusually durable, even when subjected to the strains to which a ball is subjected in a game like polo. So also, by providing smooth opposed faces of the core-housing film 3 and the cover 4, I permit adjacent portions of the film and cover to slide momentarily upon each other during the indenting of the cover when struck and during the return of the ball to its normal shape, so as not to retard the prompt resumption of the proper spherical shape by the ball.

However, while I have heretofore described my novel ball in an embodiment including certain details, I do not wish to be limited in these respects, since changes might be made without departing either from the spirit of my invention or from the appended claims.

I claim as my invention:

1. A ball of the class described, comprising a spherical core of foam rubber in which the density increases radially inward of the core, and a leather cover housing the core.

2. A ball of the class described, comprising a spherical core of foam rubber in which the density increases progressively radially inward of the core, a film of elastic and non-porous rubber housing the core and sealed to the core, and a cover of leather or the like snugly fitted over the said film.

3. A ball of the class described, comprising an integral core of foam rubber in which the density increases radially inward of the core; the density being such that the central portion of the core when sectioned presents cells imperceivable by the unaided human eye, while the radially outer core portion when sectioned shows filled cells clearly seen with the unaided eye; and a leather cover housing the core.

4. A ball of the class described, comprising an integral core of foam rubber in which the density increases radially inward of the core; the density being such that the central portion of the core when sectioned presents cells imperceivable by the unaided human eye, while the radially outer core portion when sectioned shows filled cells clearly seen with the unaided eye; a non-porous film of elastic rubber housing and secured to the core; and a leather cover snugly fitted over the said film.

5. A ball of the class described, comprising an integral core of foam rubber in which the density increases radially inward of the core; the density being such that the central portion of the core when sectioned presents cells imperceivable by the unaided human eye, while the radially outer core portion when sectioned shows filled cells clearly seen with the unaided eye; a non-porous film of elastic rubber housing and integrally secured to the core; and a leather cover snugly fitted over the said film.

6. A ball of the class described, comprising an integral core of foam rubber in which the density increases radially inward of the core; the density being such that the central portion of the core when sectioned presents cells imperceivable by the unaided human eye, while the radially outer core portion when sectioned shows filled cells clearly seen with the unaided eye; a non-porous film of elastic rubber housing and integrally secured to the core; and a leather cover snugly fitted over the said film and of greater thickness than the said film.

7. A ball of the class described, comprising a spherical core of elastic rubber permeated throughout by cells sealed from one another and having the size of the cells decreasing progressively from the exterior of the core to the center of the core and having the said cells filled with a gas; a film of non-porous and elastic rubber housing and sealed to the core; and a leather cover fitted over the said film.

8. A ball of the class described, comprising a spherical core of elastic rubber permeated throughout by cells sealed from one another and having the size of the cells decreasing progressively from the exterior of the core to the center of the core and having the said cells filled with a gas; a film of non-porous and elastic rubber housing and sealed to the core; and a leather cover fitted over the said film, the said film and cover presenting smooth surfaces to each other.

9. A ball of the class described, comprising a spherical core of elastic rubber permeated throughout by cells sealed from one another and having the size of the cells decreasing progressively from the exterior of the core to the center of the core and having the said cells filled with a gas and presenting outwardly open cup-shaped recesses at its exterior; a film of non-porous and elastic rubber housing the core and closing the mouths of the said recesses; and a leather cover fitted over the said film.

Signed at Chicago, Illinois, March 20th, 1930.

GORDON MEURISSE.